(12) United States Patent
Ye

(10) Patent No.: US 11,577,499 B1
(45) Date of Patent: Feb. 14, 2023

(54) GLUE JAMMING PREVENTION STRUCTURE OF LAMINATOR

(71) Applicant: Guangdong Willing Technology Corporation, Guangdong (CN)

(72) Inventor: Jingnong Ye, Huizhou (CN)

(73) Assignee: GUANGDONG WILLING TECHNOLOGY CORPORATION, Guangdong (CN)

( * ) Notice: Subject to any disclaimer, the term of this patent is extended or adjusted under 35 U.S.C. 154(b) by 0 days.

(21) Appl. No.: 17/556,998

(22) Filed: Dec. 20, 2021

(51) Int. Cl.
*B32B 37/00* (2006.01)

(52) U.S. Cl.
CPC .. *B32B 37/0046* (2013.01); *B32B 2037/0061* (2013.01)

(58) Field of Classification Search
CPC .................. B32B 37/0046; B32B 2037/0061
See application file for complete search history.

(56) References Cited

U.S. PATENT DOCUMENTS

2007/0074810 A1* 4/2007 Kao .................... B32B 37/1027
156/583.1
2007/0193691 A1* 8/2007 Arafat ................. B32B 37/0053
156/580

FOREIGN PATENT DOCUMENTS

JP      H01184121 A  *  7/1989

OTHER PUBLICATIONS

JPH01184121A Machine Translation of Description (Year: 2022).*

* cited by examiner

*Primary Examiner* — Cynthia L Schaller
(74) *Attorney, Agent, or Firm* — Leong C. Lei

(57) ABSTRACT

A glue jamming prevention structure of a laminator is disclosed, having a main structure that includes a housing, an entry opening and an out-feeding opening respectively arranged at two sides of the housing, a left side board, a right side board, and a power element arranged in the housing. A first entry driving axle, a second entry driving axle, a first out-feeding driving axle, a second out-feeding driving axle, a left-side elastic assembly, and a right-side elastic assembly are arranged on the left side board and the right side board. A first driving belt is arranged on the first entry driving axle and the first out-feeding driving axle. A second driving belt is arranged on the second entry driving axle and the second out-feeding driving axle.

4 Claims, 6 Drawing Sheets

GLUE JAMMING PREVENTION STRUCTURE OF LAMINATOR

TECHNICAL FIELD OF THE INVENTION

The present invention relates to a glue jamming prevention structure of a laminator, and more particularly to a glue jamming prevention structure of a laminator that prevents occurrences of glue jamming events.

DESCRIPTION OF THE PRIOR ART

Generally, a laminator is used in such a way that an object (such as a piece of paper or a photo) to be sealed with heating is first enveloped in a plastic film and is then introduced into the laminator to be worked on by a heating element of the laminator to achieve an effect of heat-sealing. In this way, the plastic film is placed on the outsides of the object to be sealed to achieve the effect of lamination and protection.

A general laminator includes, as being arranged in an interior thereof, two rollers that are in the proximity of each other for driving an object to be heat-sealed to move into the laminator to subsequently subject to a heat-sealing operation. However, with such a movement being driven only by the two rollers, if a problem in respect of size (such as an excessively large thickness or non-uniformity of thickness) is encountered, a glue jamming event may be generated, leading to the likely situations of unsmooth lamination or incomplete lamination. This makes the use inconvenient.

SUMMARY OF THE INVENTION

The primary objective of the present invention is that an effect of preventing glue jamming is achieved by using a first driving belt and a second driving belt in collaboration with a left-side elastic assembly and a right-side elastic assembly.

To achieve the above objective, the present invention provides a main structure that comprises: a housing, an entry opening arranged on the housing, an out-feeding opening arranged on the housing and located opposite to the entry opening, a left side board arranged in the housing, a right side board arranged in the housing and located opposite to the left side board, a first entry driving axle arranged in the housing and having two ends rotatably connected to the left side board and the right side board, respectively, a second entry driving axle arranged in the housing and having two ends rotatably connected to the left side board and the right side board, respectively, a power element arranged in the housing and coupled to the first entry driving axle and the second entry driving axle, a first out-feeding driving axle arranged in the housing and having two ends rotatably connected to the left side board and the right side board, respectively, a second out-feeding driving axle arranged in the housing and having two ends rotatably connected to the left side board and the right side board, respectively, a left-side elastic assembly arranged on the left side board and abutting and pressing the first out-feeding driving axle and the second out-feeding driving axle, a right-side elastic assembly arranged on the right side board and abutting and pressing the first out-feeding driving axle and the second out-feeding driving axle, a first driving belt arranged on the first entry driving axle and the first out-feeding driving axle, and a second driving belt arranged on the second entry driving axle and the second out-feeding driving axle, wherein the first entry driving axle and the second entry driving axle are located adjacent to one side of the entry opening, and the first out-feeding driving axle and the second out-feeding driving axle are located adjacent to one side of the out-feeding opening.

With the structure described above, a user place an object-to-be-heat-sealed through the entry opening into the housing, and under such a condition, the power element drives the first entry driving axle and the second entry driving axle to rotate, so as to cause the first driving belt and the second driving belt to rotate for driving the object-to-be-heat-sealed to move, and also the first out-feeding driving axle and the second out-feeding driving axle are driven to rotate by means of operative coupling with the first driving belt and the second driving belt to eventually feed a heat-sealing-completed object out through the out-feeding opening.

Normally, the left-side elastic assembly and the right-side elastic assembly press and hold the first out-feeding driving axle and the second out-feeding driving axle. In case that, during heat-sealing of the object, a situation that an excessively large size or irregular protrusions occurs, the first driving belt and the second driving belt are pushed and become deformed so as to cause the first out-feeding driving axle and the second out-feeding driving axle to compress the left-side elastic assembly and the right-side elastic assembly, thereby keeping the first out-feeding driving axle and the second out-feeding driving axle continuously rotating, without resulting in a glue jamming situation, and therefore use convenience is enhanced.

By means of the above technique, the drawback that the prior art laminators may readily cause a glue jamming situation can be overcome, and a practical improvement that realizes the above advantage is achieved.

DETAILED DESCRIPTION OF THE PREFERRED EMBODIMENT

Figure 1:
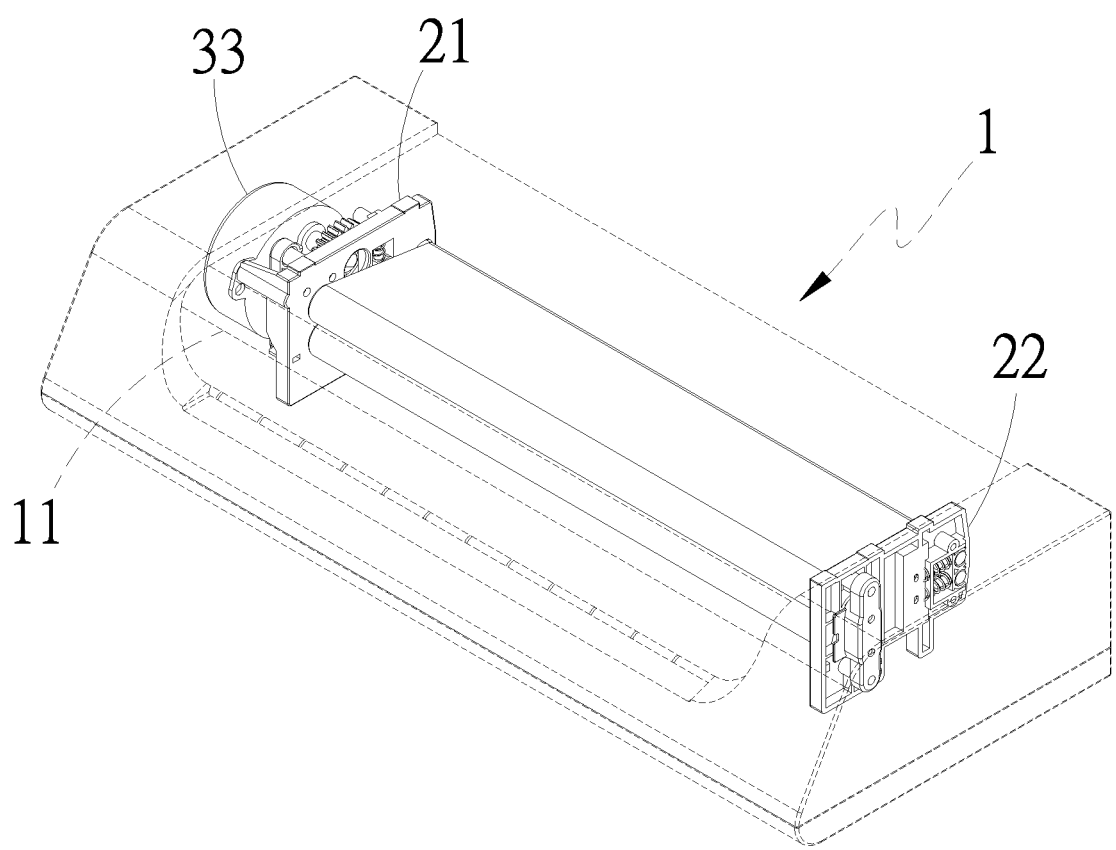
FIG. 1 is a perspective view, in a see-through form, showing a preferred embodiment of the present invention.
Figure 2:
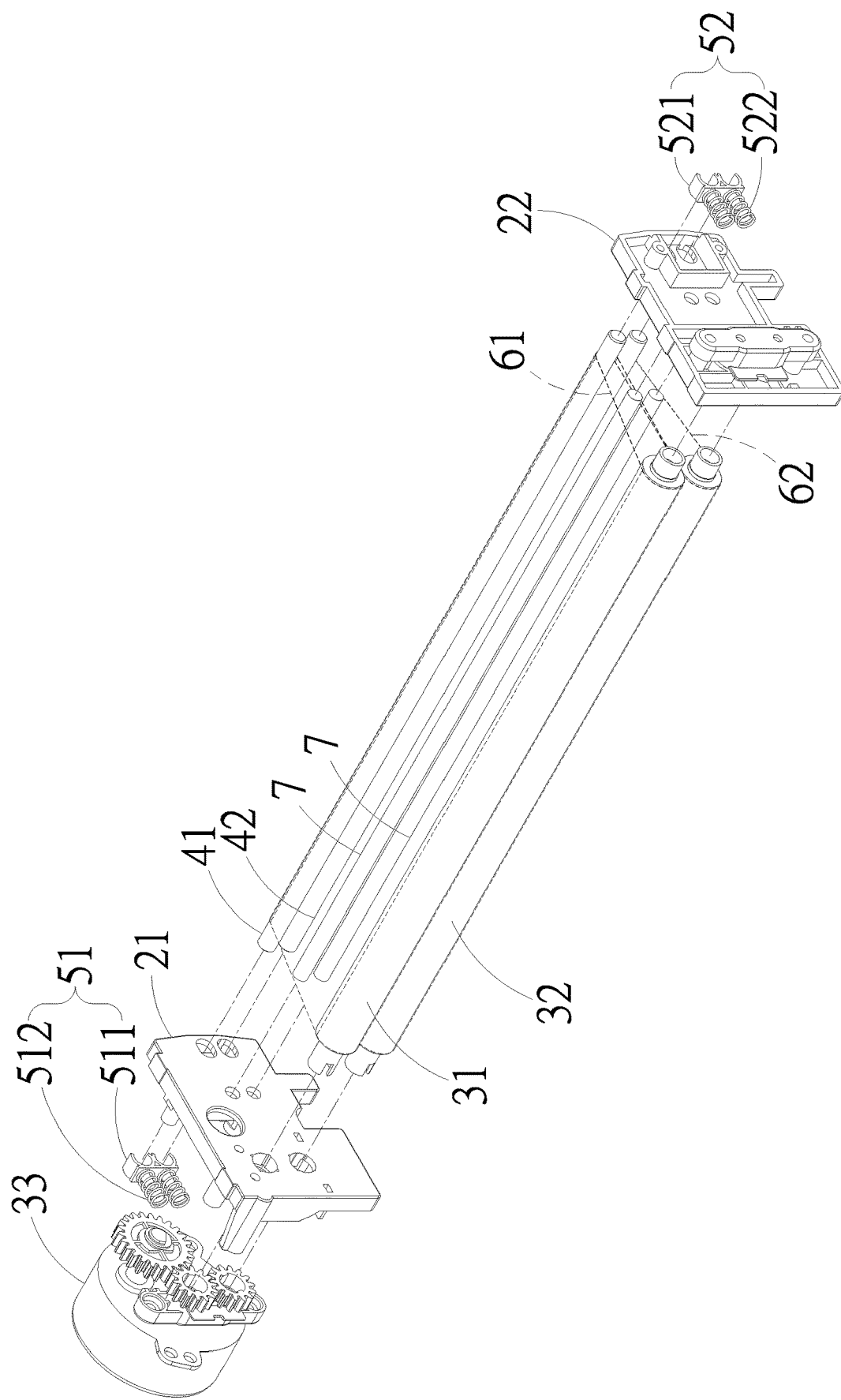
FIG. 2 is an exploded view showing the preferred embodiment of the present invention.
Figure 3:
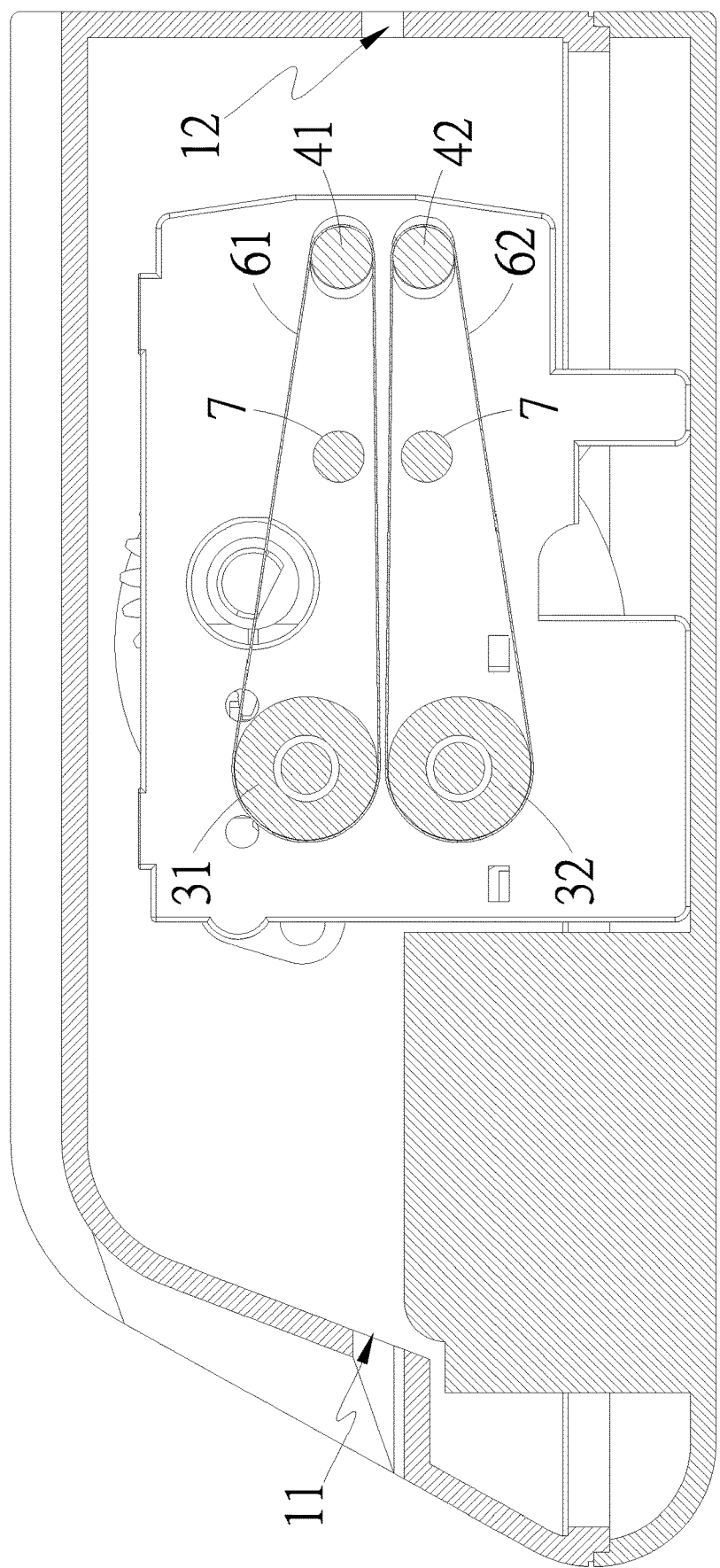
FIG. 3 is a cross-sectional view showing the preferred embodiment of the present invention.

Referring to FIGS. 1-3, which are respectively a perspective view, in a see-through form, showing a preferred embodiment of the present invention, an exploded view showing the preferred embodiment of the present invention, and a cross-sectional view showing the preferred embodiment of the present invention, it can be clearly seen in the drawings that the present invention comprises:

a housing 1;

an entry opening 11 arranged on the housing 1;

an out-feeding opening 12 arranged on the housing 1 and located at an opposite side relative to the entry opening 11;

a left side board 21 arranged in the housing 1;

a right side board 22 arranged in the housing 1 and located at an opposite side relative to the left side board 21;

a first entry driving axle 31 arranged in the housing 1 and having two ends rotatably connected to the left side board 21 and the right side board 22, respectively;

a second entry driving axle 32 arranged in the housing 1 and having two ends rotatably connected to the left side board 21 and the right side board 22, respectively;

a power element 33 arranged in the housing 1 and coupled to the first entry driving axle 31 and the second entry driving axle 32, wherein, in the instant embodiment, a servo motor is taken as an example for illustrating the power element 33, and the power element 33 is coupled through gears to drive the first entry driving axle 31 and the second entry driving axle 32 to rotate;

a first out-feeding driving axle 41 arranged in the housing 1 and having two ends rotatably connected to the left side board 21 and the right side board 22, respectively;

a second out-feeding driving axle 42 arranged in the housing 1 and having two ends rotatably connected to the left side board 21 and the right side board 22, respectively, wherein in the instant embodiment, the first entry driving axle 31 and the second entry driving axle 32 have cross-sectional radii that are greater than cross-sectional radii of the first out-feeding driving axle 41 and the second out-feeding driving axle 42;

a first driving belt 61 arranged on the first entry driving axle 31 and the first out-feeding driving axle 41;

a second driving belt 62 arranged on the second entry driving axle 32 and the second out-feeding driving axle 42;

a left-side elastic assembly 51 arranged on the left side board 21 and abutting and pressing against the first out-feeding driving axle 41 and the second out-feeding driving axle 42, wherein the left-side elastic assembly 51 comprises a left-side pushing member 511 connected to the first out-feeding driving axle 41 and the second out-feeding driving axle 42, and a plurality of left-side elastic members 512 pushing against the left-side pushing member 511;

a right-side elastic assembly 52 arranged on the right side board 22 and abutting and pressing against the first out-feeding driving axle 41 and the second out-feeding driving axle 42, wherein the right-side elastic assembly 52 comprises a right-side pushing member 521 connected to the first out-feeding driving axle 41 and the second out-feeding driving axle 42, and a plurality of right-side elastic members 522 pushing against the right-side pushing member 521; and a plurality of heating elements 7 arranged in the housing 1 and located beside the first driving belt 61 and the second driving belt 62.

Based on the above description, the structure of the technical solution of the present invention is expounded, and based on collaboration achieved with such a structure, an advantage of preventing glue jamming and thus enhancing operation performance can be achieved. A more detailed description will be provided below.

Figure 4:
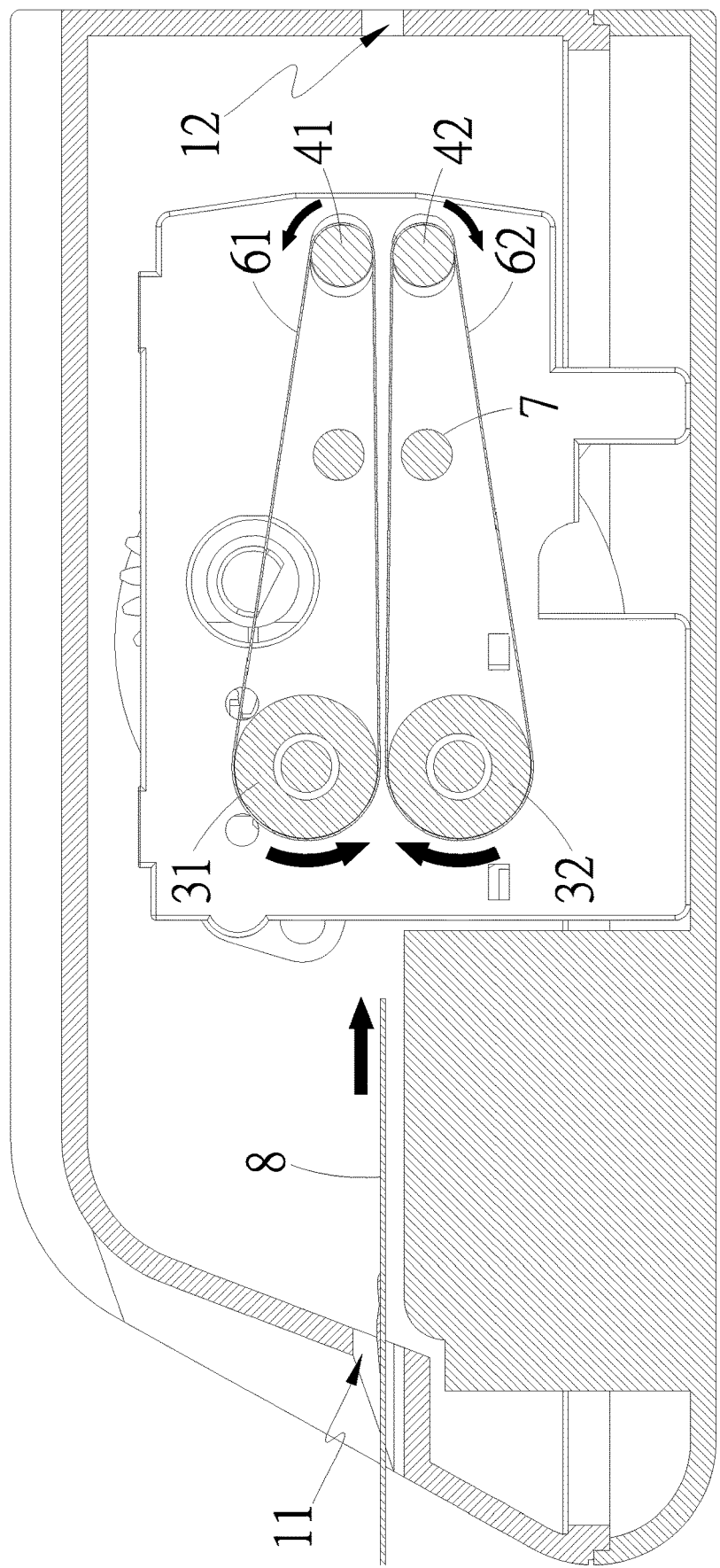
FIG. 4 is a schematic view demonstrating driving and heat-sealing performed with the preferred embodiment of the present invention.

Referring jointly to FIGS. 1-6, which are respectively a perspective view, in a see-through form, showing a preferred embodiment of the present invention, an exploded view showing the preferred embodiment of the present invention, a cross-sectional view showing the preferred embodiment of the present invention, a schematic view demonstrating driving and heat-sealing performed with the preferred embodiment of the present invention, a schematic view demonstrating deforming performed with the preferred embodiment of the present invention, and a schematic view demonstrating pushing performed with the preferred embodiment of the present invention, with an assembly of the above-described parts/components, it can be clearly seen from the drawings that a user place an object-to-be-heat-sealed 8, in the way shown in FIG. 4, through the entry opening 11 into the housing 1, and under such a condition, the power element 33 drives the first entry driving axle 31 and the second entry driving axle 32 to rotate, so as to cause, through operative coupling, the first driving belt 61 and the second driving belt 62 to rotate, and also to drive the first out-feeding driving axle 41 and the second out-feeding driving axle 42 to rotate by means of operative coupling with the first driving belt 61 and the second driving belt 62, to thereby carry out a heat-sealing operation when the object-to-be-heat-sealed 8 is moving through the heating elements 7, and thus an effect of lamination and protection is achieved. After the heat-sealing operation is completed, the object 8 is conducted to the outside of the housing 1 through the out-feeding opening 12.

Figure 5:
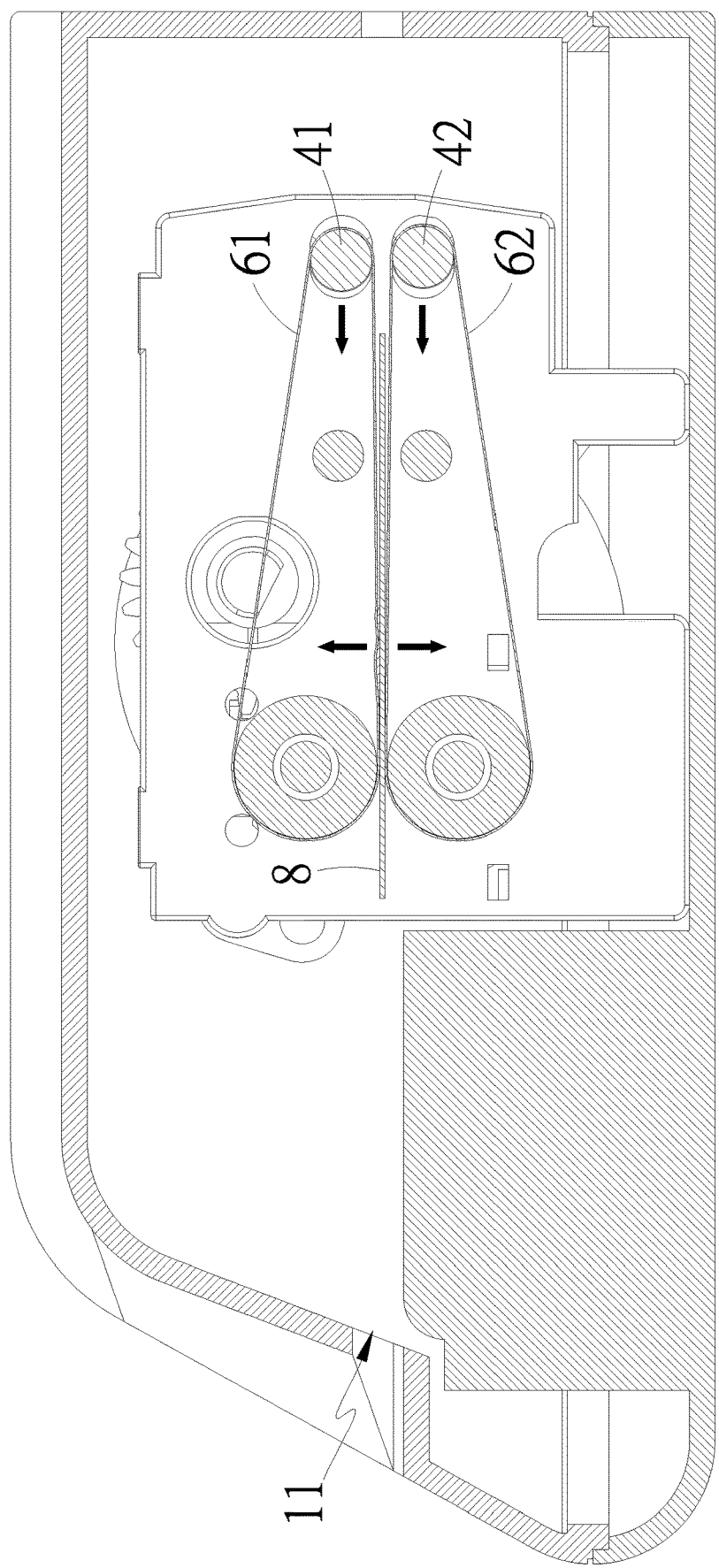
FIG. 5 is a schematic view demonstrating deforming performed with the preferred embodiment of the present invention.
Figure 6:
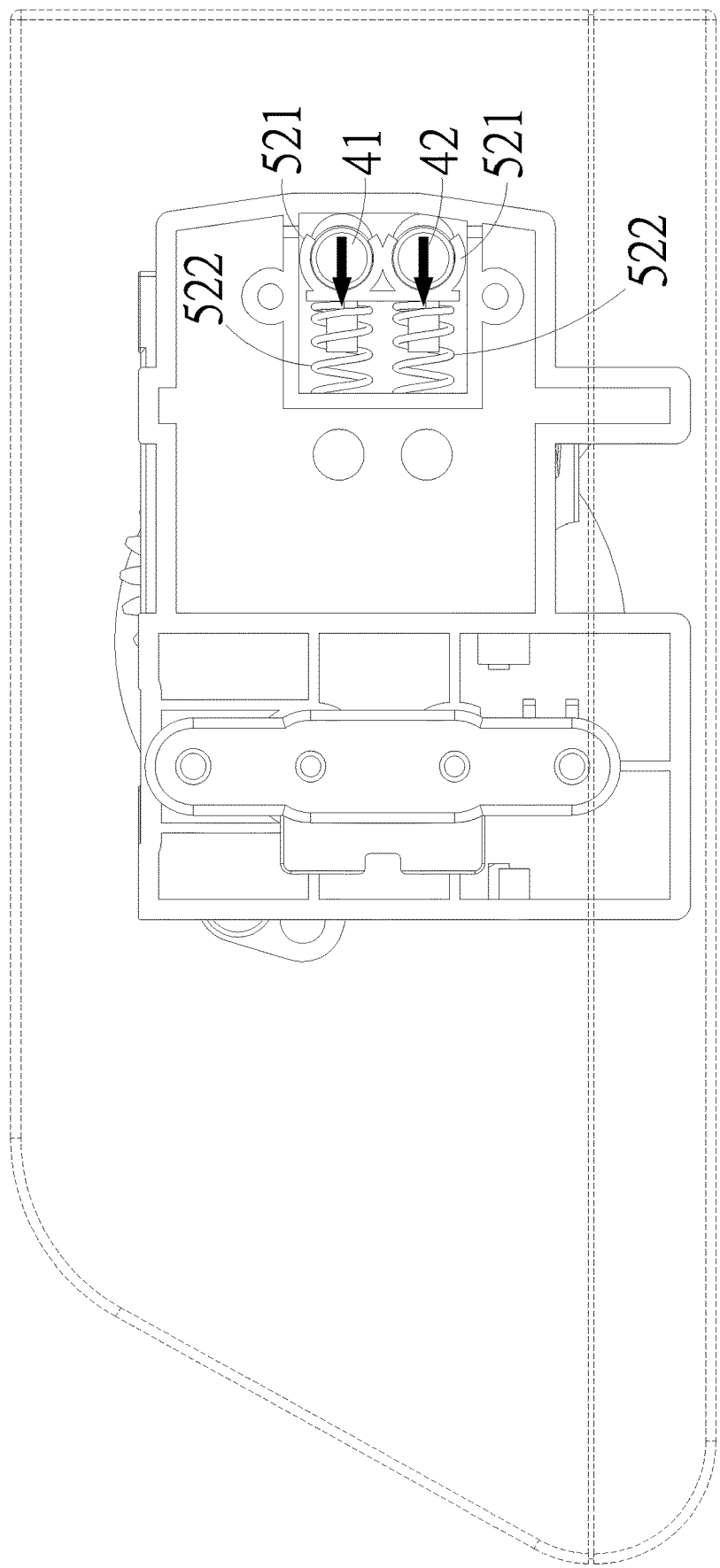
FIG. 6 is a schematic view demonstrating pushing performed with the preferred embodiment of the present invention.

In a general operation, the first out-feeding driving axle 41 and the second out-feeding driving axle 42 are pressed and held by pressing force applied by the left-side pushing member 511 of the left-side elastic assembly 51 and the right-side pushing member 521 of the right-side elastic assembly 52 through the left-side elastic members 512 and the right-side elastic members 522, so that the first driving belt 61 and the second driving belt 62 are set in a stretched and taut condition in order to increase contact areas of the first driving belt 61 and the second driving belt 62 with respect to the object 8 to thereby make the operation of driving to move smoother. In case that the object 8 has a thickness that is excessively large or includes irregular protrusions, as shown in FIGS. 5 and 6, the first driving belt 61 and the second driving belt 62 are subjected to push and become deformed, thereby causing the first out-feeding driving axle 41 and the second out-feeding driving axle 42 to compress the left-side elastic assembly 51 and the right-side elastic assembly 52 in order to suit to the shape of the object 8, so that the first driving belt 61 and the second driving belt 62 can be kept in completely attaching to the object 8 even in case of excessively large thickness or irregular protrusions, to thereby prevent a situation of glue jamming.

I claim:

1. A glue jamming prevention structure of the laminator, comprising:

a housing;

an entry opening, the entry opening being arranged on the housing;

an out-feeding opening, the out-feeding opening being arranged on the housing and located at an opposite side relative to the entry opening;

a left side board, the left side board being arranged in the housing;

a right side board, the right side board being arranged in the housing and located at an opposite side relative to the left side board;

a first entry driving axle, the first entry driving axle being arranged in the housing and having a left-side end rotatably connected to the left side board and a right-side end rotatably connected to the right side board, and located at one side of the entry opening;

a second entry driving axle, the second entry driving axle being arranged in the housing and having a left-side end rotatably connected to the left side board and a right-side end rotatably connected to the right side board, and located at one side of the entry opening;

a power element, the power element being arranged in the housing and coupled to the first entry driving axle and the second entry driving axle;

a first out-feeding driving axle, the first out-feeding driving axle being arranged in the housing and having a left-side end rotatably connected to the left side board and a right-side end rotatably connected to the right side board, and located at one side of the out-feeding opening;

a second out-feeding driving axle, the second out-feeding driving axle being arranged in the housing and having a left-side end rotatably connected to the left side board and a right-side end rotatably connected to the right side board, and located at one side of the out-feeding opening;

a left-side elastic assembly, the left-side elastic assembly being arranged on the left side board and abutting and pressing the first out-feeding driving axle and the second out-feeding driving axle;

a right-side elastic assembly, the right-side elastic assembly being arranged on the right side board and abutting and pressing the first out-feeding driving axle and the second out-feeding driving axle;

a first driving belt, the first driving belt being arranged on the first entry driving axle and the first out-feeding driving axle; and a second driving belt, the second driving belt being arranged on the second entry driving axle and the second out-feeding driving axle, wherein the left-side elastic assembly comprises a left-side pushing member connected to the first out-feeding driving axle and the second out-feeding driving axle, and a plurality of left-side elastic members pushing against the left-side pushing member, wherein the left-side pushing member is of a one-piece structure and the plurality of left-side elastic members are collectively mounted on the one-piece structure of the left-side pushing member; and wherein the right-side elastic assembly comprises a right-side pushing member connected to the first out-feeding driving axle and the second out-feeding driving axle, and a plurality of right-side elastic members pushing against the right-side pushing member, wherein the right-side pushing member is of a one-piece structure and the plurality of right-side elastic members are collectively mounted on the one-piece structure of the right-side pushing member.

2. The glue jamming prevention structure of the laminator according to claim 1, wherein a plurality of heating elements are arranged in the housing and located beside the first driving belt and the second driving belt.

3. The glue jamming prevention structure of the laminator according to claim 1, wherein the power element is coupled through gears to drive the first entry driving axle and the second entry driving axle to rotate.

4. The glue jamming prevention structure of the laminator according to claim 1, wherein the first entry driving axle and the second entry driving axle have cross-sectional radii that are greater than cross-sectional radii of the first out-feeding driving axle and the second out-feeding driving axle.

* * * * *